June 1, 1926.

H. TOLPUTT 1,587,052

VALVE FOR MOTIVE POWER ENGINES OF THE RECIPROCATORY TYPE

Filed Jan. 19, 1920     4 Sheets-Sheet 1

Inventor:
Herbert Tolputt
By C. P. Goepel
his Attorney

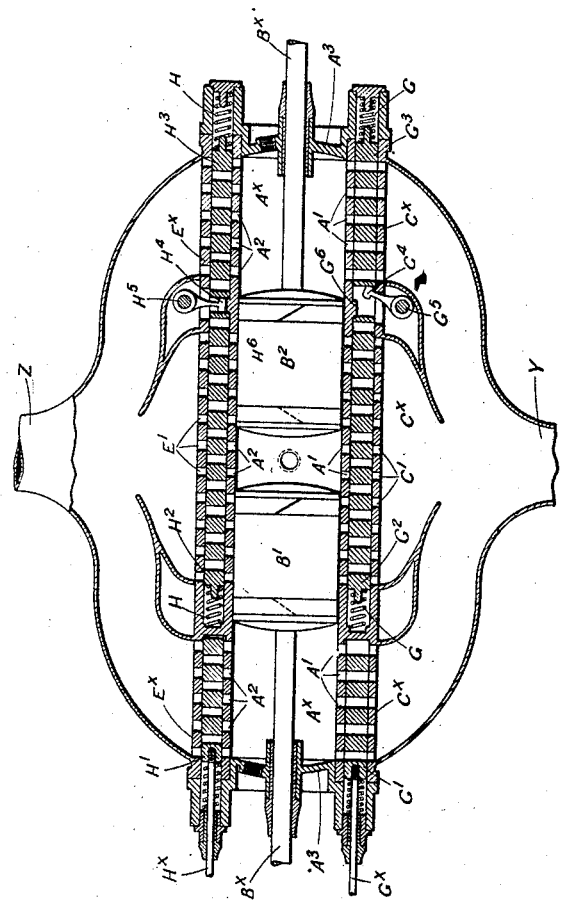

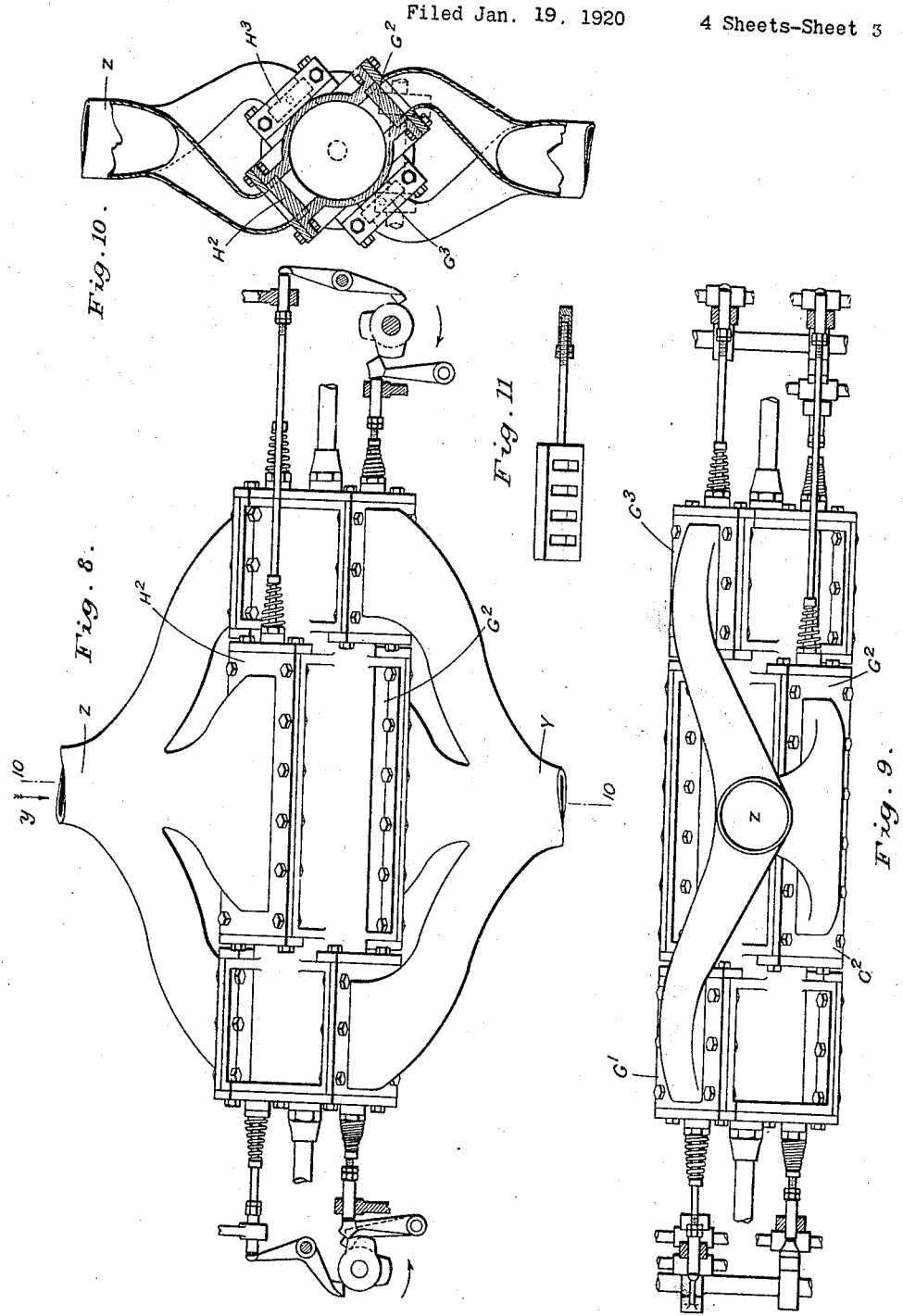

June 1, 1926.

H. TOLPUTT 1,587,052

VALVE FOR MOTIVE POWER ENGINES OF THE RECIPROCATORY TYPE

Filed Jan. 19, 1920  4 Sheets-Sheet 4

Inventor:
Herbert Tolputt
By C. P. Grupe
his Attorney

Patented June 1, 1926.

1,587,052

UNITED STATES PATENT OFFICE.

HERBERT TOLPUTT, OF SHEFFIELD, ENGLAND.

VALVE FOR MOTIVE-POWER ENGINES OF THE RECIPROCATORY TYPE.

Application filed January 19, 1920, Serial No. 352,587, and in Great Britain January 23, 1919.

This invention refers to valves for motive power engines of the reciprocatory type and is especially designed for internal combustion engines but may be used for any other motive power engines for which same may be applicable.

In the case of an internal combustion engine it has already been proposed to provide a series of admission ports and a series of exhaust ports in the wall of the cylinder, said ports being inclined or otherwise arranged and each of said series extending parallel to the axis of the cylinder for a distance preferably equivalent to the major portion of the piston travel. To render the aforesaid admission and exhaust ports effective at appropriate times that is to say as regards the desired cut-off and so that the engine would operate on the four-cycle system a valve device was provided to positively open and close said ports during the reciprocations of the piston. Said valve device consisted of an inner sleeve or lining to the cylinder provided with a single series of ports adapted to register with the aforesaid admission and exhaust ports in succession when suitably rotated at the rate of one revolution for each two revolutions of the crank shaft. The admission and the exhaust ports were therefore to be controlled both by the piston and by the rotary sleeve valve. Such an arrangement would obviously set up considerable friction owing in great measure to the simultaneous rotary movement of the sleeve valve and reciprocatory movement of the working piston therein.

Now the same dual control by the working piston on the one hand and by a valve device on the other hand of a series of admission and exhaust ports formed in the wall of the working cylinder and extending in the known manner over at least the major portion of the working stroke of the piston is effected according to the present invention by employing, in place of a rotary sleeve valve as aforesaid, two through-ported slide valves each reciprocating in a recess arranged parallel to the axis of said cylinder and immediately adjacent to the series of ports in the wall of said cylinder, one of said slide valves controlling said series of admission ports and the other controlling said series of exhaust ports while each of said slide valves is provided with a series of through ports adapted in one portion of the valve to register with the corresponding series of ports as aforesaid and is backed by a plate provided with a like series of ports which plate under working pressure constitutes an effective valve-facing.

The series of ports in the wall of the working cylinder may be eliminated by forming the aforesaid recesses through the wall of said cylinder and making the inner face of each slide valve aforesaid to conform to and in part complete the internal surface of the working cylinder each slide valve being backed by a like ported plate as aforesaid.

In either case the arrangement may be restricted to one slide-valve and one series or one set of series of ports for both admission and exhaust by providing an additional valve to afford free communications between said ports and the admission and exhaust pipes alternately.

The valve mechanism according to the present invention is equally applicable to that type of motive power engine in which two single-acting pistons are arranged in a single cylinder and work therein in opposite directions the source of pressure being admitted between said pistons. Where in this type of engine the aforesaid pistons are double-acting and it be desired to employ for each admission and exhaust a single slide valve operating in conjunction with an additional valve adapted to afford free communication with the admission and exhaust pipes alternately as aforesaid the three slide valves with the corresponding said additional valves may either be arranged in alignment or suitably spaced around the axis of the working cylinder as may be found most convenient for the mechanism for operating the valves and for the arrangement of the admission and exhaust pipes.

When in connection with this same type of double-acting engine it be desired to employ separate valves for the admission and exhaust as aforesaid the two central valves may for example be arranged diametrically opposite and at right angles to the four end valves likewise arranged diametrically opposite in pairs the two pairs being in alignment or the three admission valves may be arranged in alignment parallel to the axis of the cylinder and diametrically opposite the three exhaust valves likewise arranged in alignment as may be found most convenient for the valve operating gear and for the disposal of the admission and exhaust pipes.

In the last-mentioned arrangement the end valves may be operated near the corresponding end of the cylinder and the central valves by corresponding tappets against the influence of springs or the valve gear at one end of the cylinder may be dispensed with and said tappets employed to operate both the central valves and adjacent end valves.

I will now proceed to describe my present invention—with reference to the accompany drawings—as applied, in several alternative forms, to internal combustion engines.

Referring to the drawings hereunto annexed:—

Fig. 7 is a longitudinal sectional view showing the valve mechanism illustrated in Figs. 1 to 3 applied to a single cylinder having two double-acting pistons working in opposite directions in said cylinder.

Fig. 8 is a view in elevation of a double-acting engine similar to Fig. 7 but having the valves differently arranged round the exterior of the cylinder as hereinafter described.

Fig. 9 is a plan of Fig. 8 looking in the direction of the arrow $y$, Fig. 8.

Fig. 10 is sectional view on the line 10—10 Fig. 8.

Fig. 11 is a separate view of one of the valves and its operating rod removed from the engine.

Figures 15, 16:
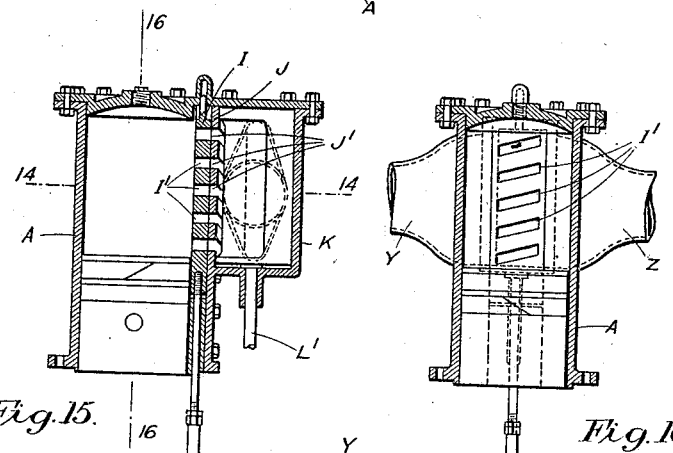
Figure 14:
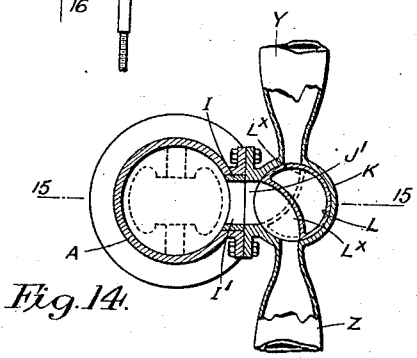

Figs. 14, 15, and 16 illustrate a further modification of the valve mechanism Fig. 14 being a sectional plan on the line 14—14 Fig. 15. Fig. 15 is a vertical section through line 15—15 of Fig. 14.

Fig. 16 is a vertical section through line 16—16 of Fig. 15.

Figure 2:
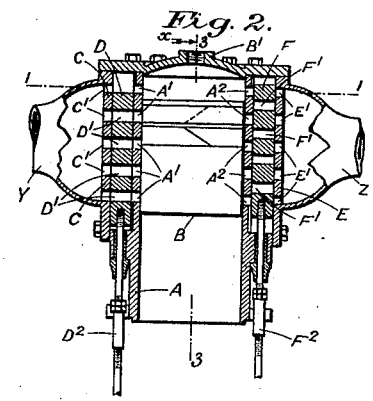
Fig. 2 is a longitudinal sectional view on line 2—2 Fig. 1.
Figure 3:
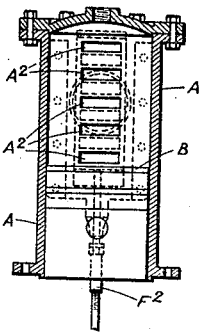
Fig. 3 is a longitudinal sectional view (at right angles to Fig. 2) on the line 3—3 Fig. 2, looking in the direction of the arrow.
Figure 1:
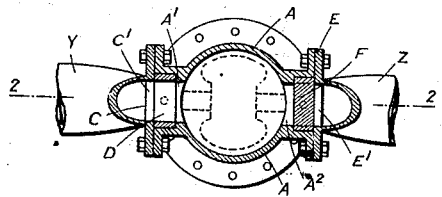
Fig. 1 is a sectional plan view on line 1—1 Fig. 2, of the cylinder of an internal combustion engine having one form of my present invention applied thereto.

Referring now to Figs. 1 to 3:—

A is the engine cylinder and B piston therein, Y is the admission or supply pipe or inlet for the explosive mixture to said cylinder A and Z the exhaust passage or outlet for the products of combustion from said cylinder A.

The cylinder A is provided in the known manner with a series of ports $A^1$ formed through the wall of the cylinder in a line lengthwise of said cylinder and extending for the major portion or nearly the full length of the stroke of the piston B in said cylinder.

An identical line of ports $A^2$ is formed through the wall of the cylinder and for convenience diametrically opposite said line of ports $A^1$.

According to the present invention the series of admission ports $A^1$ and the series of exhaust ports $A^2$ are respectively controlled by corresponding through-ported slide valves D and F each reciprocating in a corresponding recess arranged parallel to the axis of the cylinder and extending at one end to the end face of the cylinder, where the cylinder cover $B^1$ is conveniently extended to close the recesses, and at the other end terminating in a gland for the corresponding valve rods $D^2$, $F^2$. The valve D is provided with a series of through-ports $D^1$ adapted to register in one position of the valve with the series of cylinder ports $A^1$ and in like manner the valve F is provided with a series of ports $F^1$ adapted to register with the series of ports $A^2$.

The valve D is backed by a plate C provided with a series of ports $C^1$ in free communication with the admission pipe Y and identical with the series of cylinder ports $A^1$ so that in the position of the valve D shown in Fig. 2 the three series of ports $A^1$, $D^1$, $C^1$ register affording free communication between the admission pipe Y and the cylinder the total free port area increasing as the piston B proceeding on its inwards stroke uncovers more ports. In like manner the valve F is backed by a plate E provided with a series of ports $E^1$ in free communication with the exhaust pipe Z and identical with the series of cylinder ports $A^2$ so that when the valve F is moved to connect ports $A^2$ and $E^1$ a maximum port area for the exhaust is at once available. The backing plates C and E during the compression and working strokes constitute the effective valve-facings.

By way of example the recesses for the valve D and F are here shown formed in extensions cast integral with the cylinder A the backing plates C and E being located in enlargements of the admission and exhaust pipes respectively and the joints between the pipes and the cylinder being made at the outer faces of the valves. The valve rods $D^2$ and $F^2$ may be operated in the usual or any suitable manner e. g. through the medium of a half-time shaft.

Figure 5:
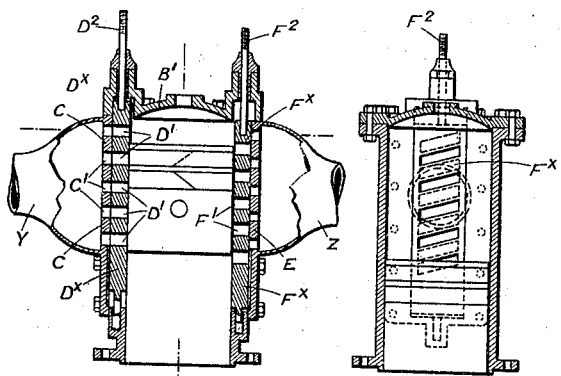
Figs. 4, 5 and 6 are corresponding views respectively to Figs. 1, 2 and 3, but showing another arrangement of the valve mechanism as hereinafter described.
Figure 6:
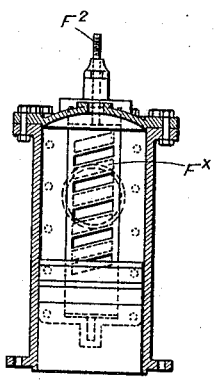
Figure 4:
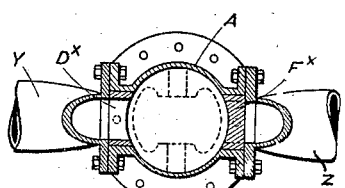

As shown in Figs. 4 to 6 the series of ports in the wall of the working cylinder may be eliminated by forming the recesses for the two through-ported slide valves $D^x$, $F^x$ through the wall of said cylinder and making the inner face of each of said valves to conform to and in part complete the internal surface of the cylinder. Backing plates C and E are provided for the valves $D^x$, $F^x$ respectively with a series of ports $C^1$, $E^1$, to correspond with the series of ports $D^1$, $F^1$ in said valves as already described with reference to Figs. 1 to 3.

Thus the piston controls the series of ports in the valves instead of the series of ports in the wall of the cylinder as in Figs. 1 to 3.

The valve rods $D^2$, $F^2$ are here shown extending through the end cover $B^1$ of the cylinder and the valves are preferably moved as far as possible in the same direction as the piston. In Fig. 6 the ports are shown inclined in the well-known manner and with the well-known object.

The valve mechanism already described is equally applicable to the counter-stroke or that type of motive power engine in which two single acting pistons are arranged in a single cylinder and work therein in opposite directions the source of pressure being admitted between said pistons.

In Fig. 7 the valve mechanism already described with reference to Figs. 1 to 3 is shown applied to the aforesaid counter-stroke type of engine having double-acting piston.

$B^1$, $B^2$ are the two double-acting pistons working in a single cylinder $A^x$ closed at each end by a cylinder cover $A^3$ each having a gland through which the piston rods $B^x$ respectively pass. The admission pipe Y is provided with three branches each terminating in a backing plate $C^x$ provided with the series of ports $C^1$ as already described. Three series of admission ports $A^1$ are provided in the wall of the cylinder as already described one series for the central admission and one series for each end admission and an independently operated admission valve having a series of through ports as already described is provided for controlling each set of series of admission ports $A^1$, $C^1$. These three admission valves are respectively indicated reading from left to right by $G^1$, $G^2$, $G^3$. In like manner the exhaust pipe Z is provided with three branches each terminating in a backing plate $E^x$ having a series of ports $E^1$; the three series of cylinder ports are indicated by $A^2$ and the three controlling exhaust valves by $H^1$, $H^2$ $H^3$ respectively.

The valves $G^1$, $H^1$ may conveniently be operated by valve rods $G^x$, $H^x$ respectively passing through glands in the cylinder cover. The valves $G^3$, $H^3$ may also be operated in the same manner and the central valves $G^2$, $H^2$ may be operated by corresponding rocking arms. As shown rocking arms $G^4$, $H^4$ mounted on rock shafts $G^5$, $H^5$ respectively operated by any suitable timing mechanism are conveniently located so as to move alternately the corresponding valves $G^2$, $G^3$ and $H^2$, $H^3$ against the influence of corresponding springs G and H tending to hold the valves $G^2$, $G^3$ against a stop $G^6$ and the valves $H^2$, $H^3$ against a stop $H^6$.

When the pistons $B^1$, $B^2$ are single-acting only all that is required is to locate the valve mechanism as described with reference to Figs. 1 to 3 or Figs. 4 to 6 so as to control the admission to, and the exhaust from, the space between two said pistons.

In Fig. 7 the line of admission ports are shown diametrically opposite the line of exhaust ports but as shown in Figs. 8 to 11, I may arrange only the end slide valves $G^1$ $G^3$ in alignment see Fig. 9 the middle slide valve $G^2$ being arranged parallel to same but at an angle of 90° round the cylinder see Figs. 9 and 10; and similarly with regard to the slides $H^1$, $H^3$ and $H^2$ so that these slide valves are arranged as shown in Fig. 10.

Figure 13:
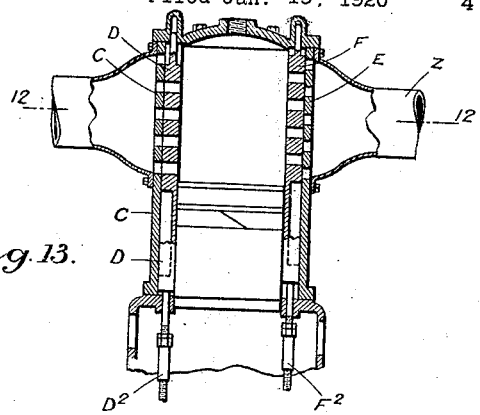
Fig. 13 is a longitudinal sectional view on line 13—13 Fig. 12.
Figure 12:
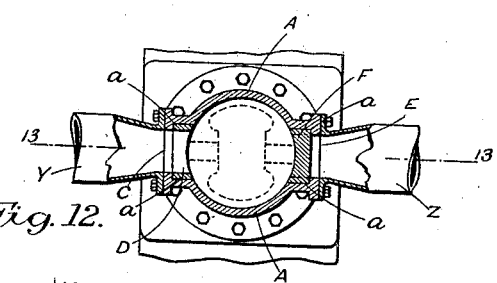
Fig. 12 is a sectional plan view on line 12—12, Fig. 13 showing a modification in the construction shown in Figs. 5 and 6 the recess for each slide valve and ported back plate for the same being formed integrally with the cylinder and extending the full length thereof the valves being operated from the crank end of the cylinder.

In the construction shown in Figs. 12 and 13 which is similar to that already described with reference to Figs. 4 to 6 the ported backing plates C, E for the valves D and F respectively are cast integrally with the extension of the cylinder forming the recesses for the valves said recesses extending from end to end of the cylinder. The valves D and F are correspondingly prolonged by recessed extensions and the operating rods are located at the crank end of the cylinder.

In the valve mechanism as described with reference to Figs. 1 to 3 or Figs. 4 to 6 the arrangement may be restricted to one set of or one series of ports for both admission and exhaust by providing an additional valve to afford free communication between said ports and the admission and exhaust pipes alternately.

In Figs. 14 to 16 such a modification is illustrated with respect to the valve mechanism described with reference to Figs. 4 to 6. Here a single valve I shaped as already described with reference to Figs. 4 to 6 and provided with the series of ports $I^1$ controls the admission and exhaust from the cylinder through the corresponding series of ports $J^1$ in the backing plate J.

Communication between the ports J¹ and the admission pipe Y and exhaust pipe Z is alternately afforded by a rotary or oscillating valve L working in a valve-box K with which the pipes Y and Z are connected.

The valve L is provided with a cavity L^x which in the position of the valve shown in full lines affords free communication between the ports J¹ and the exhaust pipe Z while in the position shown in dotted lines such communication is afforded with the supply pipe Y. The valve I provides a rapid cut-off and reduces clearances.

Obviously the valve L may equally as well be employed in conjunction with one of the valve devices as described with reference to Figs. 1 to 3 and either arrangement of valve mechanism may be also employed with the types of engines described with reference to Figs. 7 to 10.

It is also obvious that the arrangements of the valve mechanism as described with reference to Figs. 1 to 3 or Figs. 4 to 6 or Figs. 14 to 16 are equally applicable in the case of a single double acting piston.

I do not confine myself to the shape of the ports shown in drawings as I may use any other suitable form or shape of port and such ports of any suitable shape may be of any suitable length and width i. e. of any suitable area.

Furthermore such series of ports, if desired, may be other than uniform for example same may be graduated or varied in size.

What I claim is:—

1. In an internal combustion engine of the reciprocatory type, the combination of a power cylinder, induction and exhaust chambers at opposite sides of said cylinder, a working piston in said cylinder, each of said chambers extending longitudinally over the full length of the piston stroke, induction and exhaust pipes communicating with said induction and exhaust chambers respectively through slotted plates constituting the outer side walls of the chambers, each of said plates being provided with a series of spaced ports extending the full length of the chamber, a valve plate mounted in each of said chambers for reciprocating movement and provided with a series of longitudinally spaced ports to register with the ports in the outer side walls of the induction and exhaust chambers respectively, and means for actuating said valve plates.

2. In a reciprocating engine, the combination comprising a working cylinder, two double-acting pistons in said cylinder, two axial serial of ports in the wall of said cylinder, each of said series extending on either side of the longitudinal centre of said cylinder within the outward strokes of said pistons, two axial series of ports in the wall of said cylinder extending from each end of said cylinder within the stroke of the corresponding piston, a central and two terminal induction valve chambers, a central and two terminal exhaust chambers, each chamber extending axially of said cylinder and located so as to open into said cylinder through one of said series of ports in the cylinder-wall, a manifold induction having a branch connected with each induction valve chamber, a manifold exhaust pipe having a branch connected with each exhaust valve chamber, a valve backing plate located between each of said chambers and the corresponding manifold branch and provided with a series of ports to correspond with the appropriate axial series of ports in said cylinder-wall, a valve in each of said chambers adapted to be reciprocated parallel to the axis of said cylinder and between said backing plate and said cylinder-wall and provided with a series of through-ports adapted in one position of the valve to register with the series of ports in the corresponding backing plate and in said cylinder wall, and means for reciprocating said valves independently.

HERBERT TOLPUTT.